United States Patent Office 3,706,770
Patented Dec. 19, 1972

3,706,770
PRODUCTION OF FURANS BY REACTION OF AN OXAZOLE WITH AN ACETYLENE COMPOUND
Fritz Graf and Horst Koenig, Ludwigshafen, Germany, assignors to Badische Anilin- & Soda-Fabrik Aktiengesellschaft, Ludwigshafen am Rhine, Germany
No Drawing. Filed June 29, 1970, Ser. No. 51,004
Claims priority, application Germany, July 10, 1969, P 19 35 009.5
Int. Cl. C07d 5/16
U.S. Cl. 260—346.1 R 4 Claims

ABSTRACT OF THE DISCLOSURE

The production of furans by reaction of an oxazole with an acetylene compound. The new and known compounds obtainable by the process of the invention are solvents and starting materials for the production of dyes, plastics and plant protection agents.

---

It is known from Ullmanns Encyklopädie der technischen Chemie, volume 7, pages 714 et seq., and E. Rodd, Chemistry of Carbon Compounds, volume IV A, pages 138 et seq. that furan and various furan derivatives can be prepared. The said methods are not entirely satisfactory for commercial operation because they use difficultly accessible starting materials or can be carried out only in troublesome or uneconomical ways.

An object of this invention is a new process for producing furans in good yields and purity in a simpler and more economical way.

Another object of this invention is new furans including 3,4-bisacetoxymethylfuran-2-carboxylic nitrile,
2-cyano-3,4-biscarbethoxyfuran,
3,4-bismethoxymethylfuran-2-carboxylic nitrile,
3,4-bisacetoxymethylfuran-2-carboxylic ethyl ester,
3,4-bismethoxymethylfuran-2-carboxylic ester,
2-methyl-3,4-bismethoxymethylfuran, 3-acetoxymethylfuran,
3-acetoxymethylfuran-2-carboxylic ethyl ester,
4-acetoxymethylfuran-2-carboxylic ethyl ester,
3-acetoxymethylfuran-2-carboxylic nitrile and
4-acetoxymethylfuran-2-carboxylic nitrile.

These and other objects are achieved and furans having the general formula:

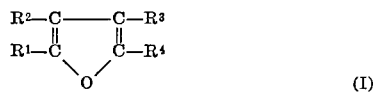

(I)

in which $R^1$, $R^2$, $R^3$ and $R^4$ may be identical or different and each denotes a hydrogen atom, an aliphatic, araliphatic, or aromatic radical, cyano, carbalkoxy, alkoxy or reacting an oxazole having the general formula:

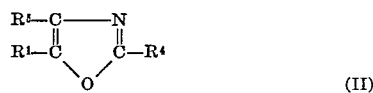

(II)

in which $R^1$ and $R^4$ have the meanings given above and $R^5$ denotes a hydrogen atom, an aliphatic, araliphatic or aromatic radical or carbalkoxy with an acetylene compound having the general formula:

$$R^2—C\equiv C—R^3$$ (III)

in which $R^2$ and $R^3$ have the meanings given above, at a temperature of from 30° to 250° C.

The reaction may be represented by the following equation in the case of 4-methyloxazole and 2-butyne-1,4-diol being used:

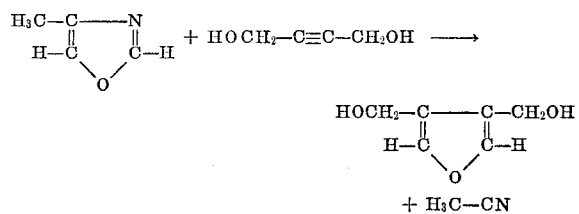

As compared with the state of the art, the process according to the invention gives a large number of furans in a simpler and more economical way and in good yields and purity, particularly substituted furans which have hitherto only been accessible by troublesome methods or not at all.

The oxazoles used as starting materials (II) may be obtained for example according to the methods described in J. Chem. Soc., vol. 1953 I, 93 et seq. and Chem. Ber., 86, 96 et seq. (1953) and 87, 700 et seq. (1954) starting from α-haloketones, acylated aliphatic acyloins, α-acyloxyketones or diesters of diene diols. Preferred starting materials (II) and consequently preferred end products (I) are those in whose formulae $R^1$, $R^4$ and $R^5$ are different or identical and each denotes a hydrogen atom, alkyl having one to six carbon atoms, aralkyl having seven to twelve carbon atoms, phenyl, or carbalkoxy having two to six carbon atoms, and $R^1$ and/or $R^4$ may also each denote cyano, carbamoyl, or alkoxy having one to five carbon atoms. The said radicals may bear, as substituents, groups and/or atoms which are inert under the reaction conditions, for example alkyl or alkoxy each having one to four carbon atoms, chlorine, bromine, hydroxyl, aliphatic acyl and acyloxy each having two to six carbon atoms, or cyano.

Suitable starting materials having the general Formula II include: 4-methyloxazole, 4-methyloxazole-5-carboxylic ethyl ester, 4-methyl-5-cyanooxazole, 2-phenyloxazole, 2-phenyl - 4 - methyloxazole, 2 - phenyl - 4 - methyloxazole-5-carboxylic isopropyl ester, 2-benzyl-4-methyloxazole, 2-methyl - 4 - phenyloxazole, 2-methyl-5-phenyloxazole, 2-benzyl-4-methyloxazole-5-carboxylic n-butyl ester, 2,4,5-trimethyloxazole, 4,5 - dimethyloxazole, 2,4 - dimethyloxazole, oxazole-2-carboxylic methyl ester, 2,5-dimethyloxazole, 4 - phenyl-5-benzyloxazole, 4-methyl-5-phenyloxazole, 5-phenyloxazole, 4-methyl-5-carbamoyloxazole, oxazole and 2-ethyl-5-methoxyoxazole.

Starting materials (II) may be reacted with the acetylene compounds having the general Formula III in stoichiometric ratio or with an excess of one starting material with reference to the other starting material, for example in a molar ratio of starting material (II) to starting material (III) of from 1:0.01 to 1:100, particularly from 1:0.2 to 1:5. Preferred starting materials (III) and consequently preferred end products (I) are those in whose formulae $R^2$ and $R^3$ identical or different and each denotes a hydrogen atom, alkyl having one to six carbon atoms, aralkyl having seven to twelve carbon atoms, phenyl, cyano, carbalkoxy having two to six carbon atoms, carbamoyl, alkoxy having one to five carbon atoms, and acyl, particularly aliphatic acyl having two to six carbon atoms. The said preferred radicals may bear, as substituents, inert groups and/or atoms, for example the substituents enumerated in connection with starting materials (II).

Examples of acetylene compounds having the general Formula III are: 2-butyne-1,4-diol, 2-butyne-1,4-diol dimethyl ether, 2-butyne-1,4-diol diacetate, propargyl methyl ether, propargyl acetate, diphenylacetylene, 2-butyne, propyne, diethyl acetylenedicarboxylate, propargyl alcohol, methyl propiolate, 2,5-dimethyl-3-hexyne-2,5-diol, 2-butynyl methyl ether, 2-butynyl acetate, acetylene, 1-benzyl-2-butyne, 1-cyano-2-butyne and 2-carbamoyl-3-hexyne.

The reaction is carried out at a temperature of from 30° to 250° C., preferably from 160° to 220° C., at atmospheric or superatmospheric pressure, continuously or batchwise. Solvents, particularly those commonly used in Diels-Alder reactions (see bibliography in Onischenko, Diene Synthesis (Israel Program for Scientific Translation, Jerusalem, 1964), such as aromatic hydrocarbons, for example benzene, toluene, xylene or p-cymene; nitriles, for example acetonitrile; chlorohydrocarbons, for example chloroform or methylene chloride, may be used if desired. The addition of hydroquinone or other stabilizers and/or catalysts such as are conventionally used in Diels-Alder reactions, for example triethylamine, trichloroacetic acid or trifluoroacetic acid may improve the yields or shorten the reaction periods in individual cases.

The reaction may be carried out as follows: a mixture of the starting materials (II) and (III), with or without a solvent, stabilizer and/or catalyst, is kept at the reaction temperature for from four to twenty-four hours. It is advantageous to react the starting materials together in an inert gas, for example under nitrogen. The end product is then separated from the reaction mixture in the usual way, for example by fractional distillation, and if necessary purified by distillation or crystallization.

The new and known compounds which can be prepared by the process according to the invention are solvents and valuable starting materials for the production of dyes, plastics and plant protection agents. Thus for example the dyes described in U.S. Pat. Nos. 2,481,673 and 2,524,674 can be prepared by reacting them with thiourea or thioacetamide. In this context the following end products (I) which have not previously been described are valuable furan compounds:

3,4-bisacetoxymethylfuran-2-carboxylic nitrile,
2-cyano-3,4-biscarbethoxyfuran,
3,4-bismethoxymethylfuran-2-carboxylic nitrile,
3,4-bisacetoxymethylfuran-2-carboxylic ethyl ester,
3,4-bismethoxymethylfuran-2-carboxylic esters,
2-methyl-3,4-bismethoxymethylfuran,
3-acetoxymethylfuran,
3-acetoxymethylfuran-2-carboxylic ethyl ester,
4-acetoxymethylfuran-2-carboxylic ethyl ester,
3-acetoxymethylfuran-2-carboxylic nitrile, and
4-acetoxymethylfuran-2-carboxylic nitrile.

The following examples illustrate the invention. The parts given in the examples are by weight.

EXAMPLE 1

3,4-bishydroxymethylfuran 24.9 parts of 4-methyloxazole, 8.6 parts of 2-butyne-1,4-diol and 0.01 part of hydroquinone are heated at 170° C. under nitrogen in a bomb tube for twenty-four hours, and the reaction mixture is then distilled. 0.4 part of unreacted 2-butyne-1,4-diol and 8.14 parts of 3,4-bishydroxymethylfuran having a boiling point of 100° C. at 0.1 mm. are obtained, equivalent to 67.1% of the theory based on reacted 2-butyne-1,4-diol.

EXAMPLE 2

2-cyano-3,4-bisacetoxymethylfuran 32.4 parts of 4-methyl-5-cyanooxazole and 51.0 parts of 2-butyne-1,4-diol diacetate are heated in an agitated autoclave with the addition of 0.01 part of hydroquinone for twenty-four hours at 170° C. The reaction is carried out under nitrogen. Distillation of the reaction mixture gives first 5.0 parts of acetonitrile at atmospheric pressure and then at a subatmospheric pressure 16.83 parts of unreacted 4-methyl-5-cyanooxazole, 25.82 parts of unreacted butynediol diacetate and 21.17 parts of 2-cyano-3,4-bisacetoxymethylfuran at 130° C. (0.06 mm.). This is a yield of 61.9% of the theory, based on reacted 4-methyl-5-cyanooxazole.

*Analysis.*—Calculated (percent): C, 55.9; H, 4.9; N, 5.8; O, 33.5. Found (percent): C, 55.69; H, 4.67; N, 5.91; O, 33.73.

EXAMPLE 3

3,4-bismethoxymethylfuran 24.9 parts of 4-methoxazole, 32.2 parts of 2-butyne-1,4-diol dimethyl ether and 0.005 part of hydroquinone are heated under nitrogen for twenty-four hours at 170° C. in an agitated autoclave. The reaction mixture is then distilled at atmospheric pressure, 18.4 parts of a mixture of acetonitrile and unreacted 4-methyloxazole thus being removed. Distillation in vacuo then gives 16.74 parts of unreacted butynediol ether and 11.7 parts of 3,4-bismethoxymethylfuran having a boiling point of 91° C. at 17 mm. This is a yield of 52.1% of the theory, based on reacted butynediol ether.

EXAMPLE 4

3,4-bismethoxymethylfuran 11.4 parts of 2-butyne-1,4-diol dimethyl ether, 8.3 parts of 4-methyloxazole, 0.01 part of triethylamine and 0.05 part of p-cymene are heated under nitrogen at 180° C. for twenty hours. By distillation of the reaction mixture there is obtained (in addition to 5.12 parts of unreacted 4-methyloxazole) 3.44 parts of 3,4-bismethoxymethylfuran at 91° C. at 17 mm. This is a yield of 57.3% of the theory, based on the 4-methyloxazole reacted.

EXAMPLE 5

3,4-bisacetoxymethylfuran 8.3 parts of 4-methyloxazole, 17.0 parts of 2-butyne-1,4-diol diacetate and 0.005 part of hydroquinone are heated for twenty-four hours at 170° C. under nitrogen in a bomb tube and then distilled. In addition to 2.66 parts of 4-methyloxazole, 3.63 parts of 3,4-bisacetoxymethylfuran is obtained at 90° to 91° C. at 0.1 mm. This is 25.2% of the theory.

EXAMPLE 6

3,4-bisacetoxymethylfuran 16.6 parts of 4-methyloxazole, 34.0 parts of 2-butyne-1,4-diol diacetate, 150 parts of acetonitrile and 0.005 part of hydroquinone are heated to 170° C. in an autoclave. A total pressure of 600 atmospheres is set up with nitrogen and the mixture held at 170° C. for twenty-four hours. The solvent is then distilled off at atmospheric pressure. Subsequent vacuum distillation gives 27.5 parts of unreacted butynediol diacetate and 6.8 parts of 3,4-bisacetoxymethylfuran having a boiling point of 86° C. to 90° C. at 0.1 mm. This is a yield of 84.0% of the theory, based on reacted butynediol diacetate.

EXAMPLE 7

2-cyano-3,4-biscarboethoxyfuran

Analogously to Example 5, using 10.8 parts of 4-methyl-5-cyanooxazole, 17.0 parts of acetylene dicarboxylic diethyl ester and 0.01 part of hydroquinone, there is obtained (in addition to 0.15 part of unreacted 4-methyl-5- cyanooxazole) 16.8 parts of 2-cyano-3,4-biscarbethoxyfuran having a boiling point of 110° to 112° C. at 0.1 mm. This is 71.8% of the theory, based on 4-methyl-5-cyanooxazole reacted.

*Analysis.*—Calculated (percent): C, 55.69; H, 4.67; N, 5.91; O, 33.73. Found (percent): C, 56.0; H, 4.8; N, 6.4; O, 32.6.

EXAMPLE 8

2-cyano-3,4-bismethoxymethylfuran

From 32.4 parts of 4-methyl-5-cyanooxazole, 34.2 parts of 2-butyne-1,4-diol dimethyl ether and 0.01 part of hydroquinone there are obtained, analogously to Example 3, by distillation, 3.2 parts of acetonitrile, 19.0 parts of unreacted 4-methyl-5-cyanooxazole, 23.0 parts of butynediol ether and 11.2 parts of 2-cyano-3,4-bismethoxy methylfuran having a boiling point of 80° to 82° C. at 0.3 mm., i.e. a yield of 63.3% of the theory, based on butynediol ether reacted.

*Analysis.*—Calculated (percent): C, 59.66; H, 6.12; N, 7.73; O, 26.49. Found (percent): C, 60.0; H, 6.2; N, 7.8; O, 26.2.

EXAMPLE 9

3,4-diphenylfuran 17.82 parts of diphenylacetylene and 8.3 parts of 4-methyloxazole are heated in a bomb tube with an addition of 0.01 part of hydroquinone at 200° C. for twenty-four hours under nitrogen. 1.1 parts of acetonitrile is first distilled off at atmospheric pressure from the reaction mixture and then 5.8 parts of unreacted 4-methyloxazole is distilled off. The following vacuum distillation gives first two fractions, 10.75 parts of F1 (at 88° to 90° C. at 0.01 mm.) and 10.1 parts of F2 (at 90° to 115° C. at 0.01 mm.). F1 is, according to its melting point and infrared spectrum, unchanged diphenylacetylene. F2 is extracted cold with 46 parts of methanol. 5.4 parts of 3,4-diphenylfuran having a melting point of 109° to 111° C. remains theory, based on starting material (III) reacted).

EXAMPLE 10

Furan-3,4-dicarboxylic diethyl ester 4.15 parts of 4-methyloxazole and 8.50 parts of the diethyl ester of acetylenedicarboxylic acid are heated with 0.005 part of hydroquinone for six hours at 80° C. and then distilled. 1.1 parts of acetonitrile, 1.2 parts of unreacted 4-methyloxazole and 3.9 parts of furan-3,4-dicarboxylic diethyl ester having a boiling point of 70° C. at 0.03 mm. are obtained, i.e. a yield of 51.5% of the theory, based on 4-methyloxazole reacted.

EXAMPLE 11

2-carbethoxy-3,4-bisacetoxymethylfuran 15.5 parts of 4-methyloxazole-5-carboxylic ethyl ester is heated with 17.0 parts of 2-butyne-1,4-diol diacetate and 0.01 part of hydroquinone for twenty-four hours at 170° C. under nitrogen. The reaction mixture is then distilled and gives (in addition to 1.19 parts of acetonitrile, 9.38 parts of unreacted 4-methyloxazole-5-carboxylic ester and 12.84 parts of recovered butynediol diacetate) 5.41 parts of 2-carbethoxy-3,4-bisacetoxy-methylfuran having a boiling point of 150° C. at 0.05 mm. which solidifies to crystals having a melting point of 54 to 55° C. This is 76.0% of the theory, based on butynediol diacetate reacted.

*Analysis.*—Calculated (percent): C, 54.90; H, 5.63; O, 39.47. Found (percent): C, 54.8; H, 5.7; O, 39.1.

EXAMPLE 12

2-carbethoxy-3,4-bismethoxymethylfuran

From 15.5 parts of 4-methyl-5-carbethoxyoxazole and 11.4 parts of 2-butyne-1,4-diol dimethyl ether and 0.01 part of hydroquinone there are obtained, analogously to Example 5, 9.85 parts of butynediol dimethyl ether, 11.0 parts of starting material (II) and 2.04 parts of 2-carbethoxy-3,4-bismethoxymethylfuran having a boiling point of 86° to 88° C. This is 69.2% of the theory, based on reacted 4-methyl-5-carbethoxyoxazole.

*Analysis.*—Calculated (percent): C, 57.9; H, 7.02; O, 35.1. Found (percent): C, 57.4; H, 7.2; O, 34.5.

EXAMPLE 13

2-methyl-3,4-bismethoxymethylfuran

From 7.95 parts of 2-methyl-4-phenyloxazole, 5.70 parts of 2-butyne-1,4-diol dimethyl ether and 0.005 part of hydroquinone there are obtained, analogously to Example 5 (reaction temperature 200° C.), 2.99 parts of benzonitrile, 2.21 parts of unreacted butynediol ether, 3.44 parts of unreacted 2-methyl-4-phenyloxazole and 3.03 parts of 2-methyl-3,4-bismethoxymethylfuran having a boiling point of 88° to 91° C. at 8 mm., i.e. 63.5% of the theory, based on the methylphenyloxazole reacted.

*Analysis.*—Calculated (percent): C, 63.51; H, 8.29; O, 28.20. Found (percent): C, 63.7; H, 8.2; O, 27.5.

EXAMPLE 14

3-acetoxymethylfuran

From 33.2 parts of 4-methyloxazole, 39.2 parts of propargyl acetate and 0.01 part of hydroquinone there are obtained, analogously to Example 3, 9.15 parts of acetonitrile, 12.60 parts of unreacted 4-methyloxazole, 0.77 part of unreacted propargyl acetate, and 25.0 parts of 3-acetoxymethylfuran having a boiling point of 71° C. at 14 mm., i.e. 72% of the theory, based on reacted 4-methyloxazole.

*Analysis.*—Calculated (percent): C, 59.99; H, 5.75; O, 34.25. Found (percent): C, 60.0; H, 5.9; O, 33.8.

EXAMPLE 15

Acetoxymethylfuran-2-carboxylic ethyl ester

From 62.0 parts of 4-methyloxazole-5-carboxylic ethyl ester, 39.2 parts of propargyl acetate and 0.01 part of hydroquinone there are obtained, analogously to Example 3, 6.19 parts of acetonitrile, 16.7 parts of unreacted propargyl acetate, 40.67 parts of unreacted 4-methyloxazole-5-carboxylic ester and 21.35 parts of a mixture (1:1) of 3-acetoxymethylfuran-2-carboxylic ethyl ester and 4-acetoxymethylfuran-2-carboxylic ethyl ester having a boiling point of 92° C. to 98° C. at 0.1 mm. which can be separated into the two components by gas chromatography. The yield is 99% of the theory, based on 4-methyloxazole-5-carboxylic ethyl ester reacted.

EXAMPLE 16

2-cyanoacetoxymethylfuran

From 10.8 parts of 4-methyl-5-cyanooxazole, 9.8 parts of propargyl acetate and 0.005 part of hydroquinone there are obtained, analogously to Example 5, 0.77 part of acetonitrile, 6.2 parts of unreacted propargyl acetate, 4.99 parts of unreacted 4-methyl-5-cyanooxazole and 4.48 parts of a mixture (1:1) of 2-cyano-3-acetoxymethylfuran and 2-cyano-4-acetoxymethylfuran having a boiling point of 105° to 115° C. at 7 mm., i.e. 73% of the theory, based on propargyl acetate reacted. The two furan derivatives may be separated from one another by gas chromatography.

EXAMPLE 17

3,4-bismethoxymethylfuran-2-carbonamide 12.6 parts of 4-methyloxazole-5-carboxamide and 22.8 parts of 2-butyne-1,4-diol dimethyl ether are reacted analogously to Example 9. 3.9 parts of acetonitrile and 9.8 parts of unreacted butynediol dimethyl ether are distilled off from the reaction mixture; the dark residue is treated in ethanol with activated carbon, evaporated to dryness and precipitated from ethyl acetate with twice the volume of cyclohexane. 16.2 parts (82%, based on starting material (II) used) of 3,4-bismethoxymethylfuran-2-carboxamide having a melting point of 69° to 70° C. (recrystallized from a mixture of ethyl acetate and cyclohexane) is obtained.

EXAMPLE 18

Furan 22.9 parts of 4-methyloxazole is heated to 190° C. under nitrogen in an autoclave. The pressure is brought to 14 atmosphere with nitrogen and then to 25 atmospheres with acetylene. The mixture is kept for ten hours at 190° C. and 25 atmospheres, 0.5 part of acetylene being passed in during the reaction. The end product is then isolated from the reaction mixture by distillation. 1.6 parts of furan having a boiling point of 32° to 33° C. (34.2% of the theory, based on starting material (II) reacted) is obtained. 17.2 parts of unreacted starting material (II) is returned to the reaction.

We claim:

1. A process for the production of a furan of the formula

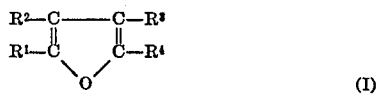
(I)

in which $R^1$ and $R^4$ each represents hydrogen, alkyl of one to six carbon atoms, aralkyl of seven to twelve carbon atoms, phenyl, or carbalkoxy of two to six carbon atoms, $R^2$ and $R^3$ each represents hydrogen, alkyl of one to six carbon atoms, aralkyl of seven to twelve carbon atoms, phenyl, cyano, carbalkoxy of two to six carbon atoms, carbamoyl, alkoxy of one to five carbon atoms, and aliphatic acyl of two to six carbon atoms, with the proviso that all of said radicals $R^1$ to $R^4$ may bear an inert substituent selected from the group consisting of alkyl or alkoxy each having one to four carbon atoms, chlorine, bromine, hydroxyl, aliphatic acyl or acyloxy each having two to six carbon atoms, cyano and carbamoyl, which process comprises:

reacting at a temperature of from 30° C. to 250° C. an oxazole of the formula

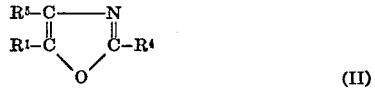
(II)

in which $R^1$ and $R^4$ have the meanings given above and $R^5$ represents hydrogen, alkyl of one to six carbon atoms, aralkyl of seven to twelve carbon atoms, phenyl or carbalkoxy having two to six carbon atoms, with the proviso that the $R^5$ radical may also bear the same inert substituents as given above, with an acetylene compound of the formula

(III)

in which $R^2$ and $R^3$ have the same meanings given above.

2. A process as claimed in claim 1 carried out at a temperature of from 160° C. to 220° C.

3. A process as claimed in claim 1 carried out in the presence of an organic solvent compatible with Diels-Alder reactions.

4. A process as claimed in claim 1 in a molar ratio of the oxazole (II) to the acetylene compound (III) of from 1:0.2 to 1:5.

References Cited

UNITED STATES PATENTS

| | | | |
|---|---|---|---|
| 2,481,673 | 9/1949 | Knott et al. | 260—302 |
| 2,524,674 | 10/1950 | Middleton | 260—240.1 |

ALEX MAZEL, Primary Examiner

B. DENTZ, Assistant Examiner

U.S. Cl. X.R.

260—347.3, 347.4, 347.5, 347.8